United States Patent
Vargas Barroso et al.

(10) Patent No.: US 11,868,291 B2
(45) Date of Patent: Jan. 9, 2024

(54) DATA TRANSFER SYSTEM AND METHOD FOR TRANSFERRING DATA IN A DATA TRANSFER SYSTEM

(71) Applicant: Siemens Aktiengesellschaft, Munich (DE)

(72) Inventors: Aharón Jesús Vargas Barroso, Herzogenaurach (DE); Christian Wagner, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/021,127

(22) PCT Filed: Aug. 4, 2021

(86) PCT No.: PCT/EP2021/071769
§ 371 (c)(1),
(2) Date: Feb. 13, 2023

(87) PCT Pub. No.: WO2022/037944
PCT Pub. Date: Feb. 24, 2022

(65) Prior Publication Data
US 2023/0244622 A1 Aug. 3, 2023

(30) Foreign Application Priority Data
Aug. 19, 2020 (EP) .................................. 20191723

(51) Int. Cl.
*G06F 13/24* (2006.01)
*G06F 13/22* (2006.01)

(52) U.S. Cl.
CPC .............. *G06F 13/24* (2013.01); *G06F 13/22* (2013.01)

(58) Field of Classification Search
CPC ................................ G06F 13/22; G06F 13/24
See application file for complete search history.

(56) References Cited

U.S. PATENT DOCUMENTS

| 3,866,175 A | 2/1975 | Seifert, Jr. et al. |
| 2002/0002406 A1 | 1/2002 | Bermann et al. |

(Continued)

FOREIGN PATENT DOCUMENTS

| DE | 198 31 405 A1 | 1/2000 | |
| WO | WO-2020046909 A1 * | 3/2020 | ............. G06F 13/24 |

OTHER PUBLICATIONS

PCT International Search Report and Written Opinion of International Searching Authority dated Nov. 25, 2021 corresponding to PCT International Application No. PCT/EP2021/071769 filed Aug. 4, 2021.

*Primary Examiner* — Glenn A. Auve
(74) *Attorney, Agent, or Firm* — Henry M. Felereisen LLC

(57) ABSTRACT

A data transfer system includes a bus system; a master unit; at least one slave unit, which is allocated to the master unit and is designed to send interrupt requests directed to the master unit; and a monitor unit, which is connected between the master unit and the bus system. The monitor unit receives messages sent by the master unit and the interrupt requests sent by each slave unit allocated to the master unit. Polling messages directed by the master unit to an allocated slave unit are not forwarded by the monitor unit to the bus system until the slave unit sends an interrupt request via an interrupt request line.

15 Claims, 2 Drawing Sheets

(56) References Cited

U.S. PATENT DOCUMENTS

| | | | |
|---|---|---|---|
| 2007/0186021 A1* | 8/2007 | Drexler | G06F 13/24 710/110 |
| 2015/0074304 A1* | 3/2015 | Adkins | G06F 13/4068 710/110 |
| 2016/0378153 A1 | 12/2016 | Kelly et al. | |

* cited by examiner

DATA TRANSFER SYSTEM AND METHOD FOR TRANSFERRING DATA IN A DATA TRANSFER SYSTEM

CROSS-REFERENCES TO RELATED APPLICATIONS

This application is the U.S. National Stage of International Application No. PCT/EP2021/071769, filed Aug. 4, 2021, which designated the United States and has been published as International Publication No. WO 2022/03794 A1 and which claims the priority of European Patent Application, Serial No. 20191723.4, filed Aug. 19, 2020, pursuant to 35 U.S.C. 119(a)-(d).

BACKGROUND OF THE INVENTION

The invention relates to a data transfer system having a bus system, and to a method for transferring data by means of such a data transfer system.

In a data transfer system having a bus system, subscribers of the data transfer system communicate with each other via the bus system and the bus system transfers data between the subscribers. A distinction is made in this case between subscribers who are allowed autonomously to initiate communication via the bus system, and subscribers who are only allowed to reply to requests. Subscribers who are allowed autonomously to initiate communication via the bus system are referred to in the following as master units. Subscribers who are only allowed to reply to requests are referred to in the following as slave units.

The transfer of data in such a data transfer system is usually controlled by software. A master unit often requires data, which is made available by a slave unit, in order to execute a specific task. For example, the slave unit has a sensor which captures data that is processed by the master unit. The task to be executed by the master unit is often time-critical, i.e. the task must be executed at the earliest possible moment, as soon as the slave unit has the required data available. In order to satisfy this requirement, so-called polling and/or so-called interrupt handling is usually implemented by the software that is used for the data transfer.

In the case of polling, a master unit queries the slave state of a slave unit cyclically by means of polling messages that are sent via the bus system, in order to find out when the slave unit has the data available that is required by the master unit.

In the case of interrupt handling, the slave unit sends a so-called interrupt request to the master unit as soon as it has the data available that is required by the master unit. Following the receipt of the interrupt request, the master unit interrupts the execution of other programs in order to execute the program that uses the data from the slave unit.

However, both polling and interrupt handling have disadvantages when transferring data on a bus system. In the case of polling, the master unit accesses the bus system repeatedly and at short intervals in order to send polling messages to a slave unit. As a consequence, it very often blocks access to this slave unit via the bus system for other master units and possibly also access to further slave units which are connected to the bus system via a connection that is shared with this slave unit. An interrupt request intervenes significantly in the program execution of the master unit, since it entails an interruption of the program that is currently being executed and a postponement of the execution of other programs, and can result in non-deterministic operation of the master unit since the instant of the interrupt request is not known.

The object of the invention is to specify a data transfer on a bus system, said data transfer being improved in respect of communication between a master unit and a slave unit.

SUMMARY OF THE INVENTION

The object is inventively achieved by a data transfer system as set forth hereinafter and by a method for transferring data as set forth hereinafter.

Advantageous embodiments of the invention are specified in the subclaims.

A data transfer system according to the invention comprises:
 a bus system,
 a master unit which is configured to send messages,
 at least one slave unit (preferably a plurality of e.g. different slave units) which is allocated to the master unit and is connected to the bus system, said slave unit being configured to send interrupt requests directed to the master unit via an interrupt request line,
 a monitor unit which is designed as a hardware component, said monitor unit being connected between the master unit and the bus system, being connected to the interrupt request line of each slave unit that is allocated to the master unit, and being configured:
 to receive the messages sent from the master unit and the interrupt requests sent via an interrupt request line from each slave unit that is allocated to the master unit, and
 to not forward to the bus system polling messages which are directed from the master unit to a slave unit that is allocated thereto, and to prevent the periodic sending of polling messages from the master unit via the bus system to the at least one slave unit allocated to the master unit, until the slave unit sends an interrupt request via the interrupt request line.

A data transfer system according to the invention differs from a corresponding conventional data transfer system in that it has a monitor unit for the (at least one) master unit, which monitor unit prevents the periodic sending of polling messages from the master unit to an allocated slave unit via the bus system until the slave unit sends an interrupt request directed to the master unit via an interrupt request line. By comparison, in the case of a corresponding conventional data transfer system, the master unit is directly connected to the bus system and the interrupt request line is connected to the master unit. In the conventional data transfer system, this means that polling messages directed from the master unit to a slave unit which is allocated thereto are periodically routed to this slave unit via the bus system, and consequently block the bus system for other master units wanting to access this slave unit or further slave units connected to the bus system via a connection that is shared with this slave unit.

By virtue of the monitor unit, provision is therefore made for the bus system to be unencumbered by periodic polling messages directed to a slave unit from the master unit, so long as the slave unit does not send an interrupt request directed to the master unit. The use of the monitor unit does not require any adaptation of the software executed by the master unit and the slave units, since the polling from the master unit and the sending of interrupt requests from the slave units continues unchanged. In other words, the monitor unit is a hardware component that is transparent for the software, and can therefore be integrated easily and advantageously into a conventional data transfer system in order to convert it into a data transfer system according to the invention.

In an embodiment of the inventive data transfer system, an address range allocated to the slave unit is stored in the monitor unit for each slave unit allocated to the master unit. The monitor unit can be configured in particular to identify, on the basis of an address contained in a polling message, whether the polling message is directed to a slave unit that is allocated to the master unit. An address range of a slave unit is understood here to be a set of addresses, e.g. device addresses or network addresses, which are uniquely allocated to the slave unit in the data transfer system. Different address ranges therefore correspond to the different slave units. By storing the address ranges allocated to the slave units in the monitor unit, the monitor unit can identify the slave units and can allocate polling messages and interrupt requests to the slave units.

In a further embodiment of the inventive data transfer system, the monitor unit is configured, following the receipt of a polling message which is directed from the master unit to a slave unit that is allocated thereto, to instruct the master unit to interrupt all programs it is executing. The monitor unit is further configured, following the receipt of an interrupt request from the slave unit, to then forward the polling message to the bus system. For example, the master unit is instructed by the monitor unit by means of a deactivation signal to interrupt all programs it is executing. In order to realize the deactivation signal, use can advantageously be made of e.g. a ready-signal which assumes the values zero and one, the value zero being used as a deactivation signal.

In the embodiment of the inventive data transfer system cited above, the master unit is therefore blocked by the monitor unit after sending a polling message directed to an allocated slave unit. When this slave unit then sends an interrupt request, this interrupt request is not sent by the monitor unit to the master unit, but is used as a trigger for forwarding the polling message to the bus system. This polling message is then answered positively by the slave unit, since the slave unit has already signaled, by means of the interrupt request, the availability of the data requested by the master unit. As a result of the positive reply from the slave unit, the polling is ended immediately. In all, only one polling message is therefore sent via the bus system and no interrupt routine is executed by the master unit in response to an interrupt request. In particular, it is therefore not necessary to implement an interrupt routine in the master unit.

In an alternative embodiment of the inventive data transfer system, the monitor unit is configured to negatively answer polling messages which are directed from the master unit to a slave unit that is allocated thereto, until the slave unit sends an interrupt request. In this embodiment of the inventive data transfer system, the monitor unit therefore indicates to the master unit by means of negatively answering polling messages that the slave unit has no data available for the master unit, so long as the slave unit does not send an interrupt request. The master unit therefore performs regular polling, but its polling messages are not sent to the slave unit via the bus system and are instead negatively answered by the monitor unit so long as the slave unit has no data available for the master unit.

In a further embodiment of the inventive data transfer system, the monitor unit is configured to forward to the bus system every message from the master unit which is not a polling message directed to a slave unit that is allocated to the master unit, and/or to forward to the master unit every message that is sent via the bus system to the master unit. This means that the monitor unit advantageously only intervenes in the polling communication of the master unit, but does not otherwise influence the communication between the master unit and other components of the data transfer system and works in a transparent mode.

According to the inventive method for transferring data in a data transfer system according to the invention:
the monitor unit receives the messages that are sent from the master unit and the interrupt requests that are sent via a respective interrupt request line from the slave units allocated to the master unit, and
the monitor unit does not forward to the bus system polling messages which are directed from the master unit to a slave unit that is allocated thereto, until the slave unit sends an interrupt request via the interrupt request line.

In an embodiment of the inventive method, the monitor unit analyzes an address contained in a polling message, in order to identify whether the polling message is directed to a slave unit that is allocated to the master unit.

In a further embodiment of the inventive method, following the receipt by the monitor unit of a polling message which is directed from the master unit to a slave unit that is allocated thereto, the monitor unit instructs the master unit to interrupt all programs it is executing. Following the receipt of an interrupt request from the slave unit, the monitor unit then forwards the polling message to the bus system.

In an alternative embodiment to the above-cited embodiment of the inventive method, polling messages which are directed from the master unit to a slave unit that is allocated thereto are negatively answered by the monitor unit until the slave unit sends an interrupt request via the interrupt request line.

In a further embodiment of the inventive method, the monitor unit forwards to the bus system every message from the master unit which is not a polling message directed to a slave unit that is allocated to said master unit, and/or forwards to the master unit every message that is sent via the bus system to the master unit.

The advantages of the method according to the invention correspond to the advantages cited above in respect of a data transfer system according to the invention.

BRIEF DESCRIPTION OF THE DRAWING

The properties, features and advantages described above in relation to the invention, and the manner in which these are realized, become clearer and easier to understand in the context of the following description of exemplary embodiments, these being explained in greater detail with reference to the drawings, in which.

DETAILED DESCRIPTION OF PREFERRED EMBODIMENTS

Figure 1:
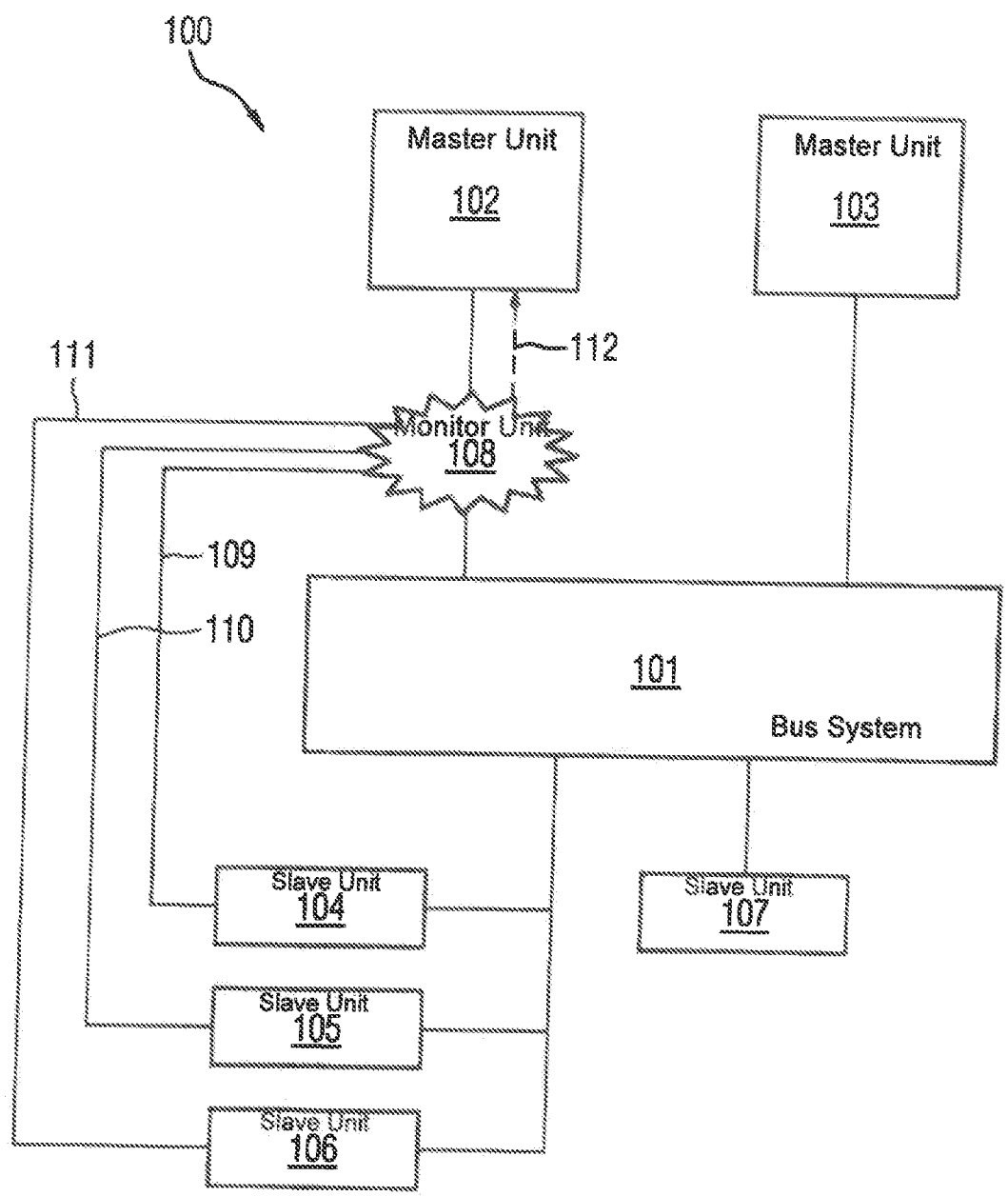
FIG. 1 shows a block diagram of an exemplary embodiment of a data transfer system according to the invention.

FIG. 1 shows a block diagram of an exemplary embodiment of a data transfer system 100 according to the invention. The data transfer system 100 comprises a bus system 101, master units 102, 103, slave units 104 to 107 and a monitor unit 108 for the master unit 102.

The monitor unit 108 is designed as a hardware component which is connected between the master unit 102 and the bus system 101. The master unit 102 is therefore not connected to the bus system 101 directly as in a conventional data transfer system, but is instead connected via the monitor unit 108. This means that the exchange of messages between the master unit 102 and the bus system 101 can only take place via the monitor unit 108. The other master unit 103 in the exemplary embodiment shown in FIG. 1 is directly connected to the bus system 101.

The slave units 104 to 107 are connected to the bus system 101. In addition, the slave units 104 to 106 are respectively connected to the monitor unit 108 via an interrupt request line 109 to 111.

The monitor unit 108 is also connected to the master unit 102 via a signal line 112. The signal line 112 is used by the monitor unit 108 to transfer e.g. a ready-signal to the master unit 102, wherein said ready-signal can assume the values zero and one.

Each master unit 102, 103 executes a communication protocol according to which they can send messages. The master unit 102 is configured in particular to send polling messages to each of the slave units 104 to 106 in order periodically to query a slave state of the respective slave unit 104 to 106.

The slave units 104 to 106 are configured inter alia to send interrupt requests directed to the master unit 102 via the respective interrupt request lines 109 to 111, and are allocated to the master unit 102 in this respect. An address range allocated to the slave unit 104 to 106 is stored in the monitor unit 108 for each of these slave units 104 to 106. The monitor unit 108 is configured to identify, on the basis of an address contained in a polling message, whether the polling message is directed to one of the slave units 104 to 106 and to which slave unit 104 to 106 the polling message is directed. The address ranges corresponding to the different slave units 104 to 106 can differ.

The monitor unit 108 is further configured to execute a method according to the invention for the transfer of data in the data transfer system 100. An exemplary embodiment of the inventive method is described below with reference to FIG. 2.

Figure 2:
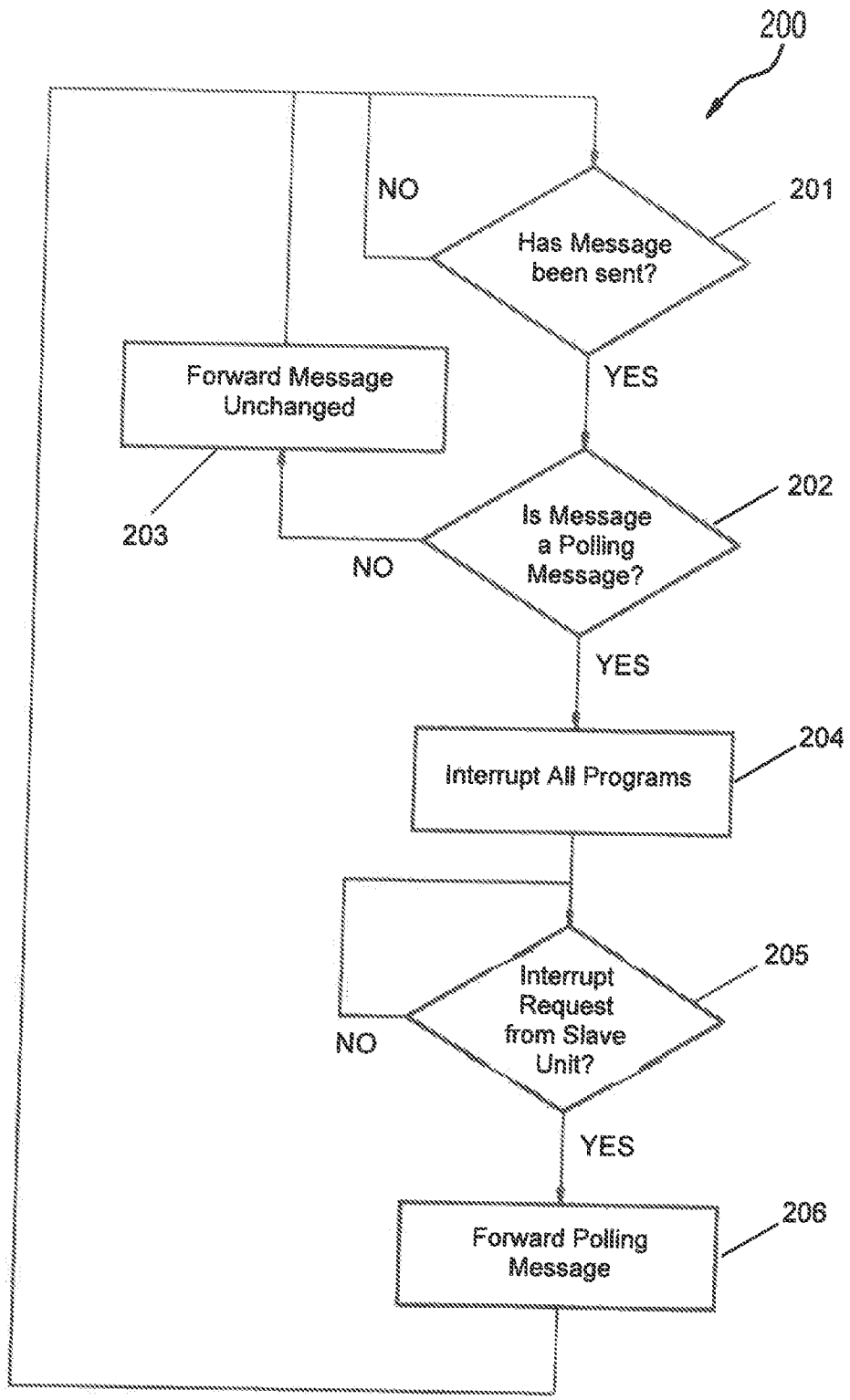
FIG. 2 shows a sequence diagram of an exemplary embodiment of a method for transferring data according to the invention.

FIG. 2 shows a sequence diagram 200 of the exemplary embodiment of the inventive method, with method steps 201 to 206 for the transfer of data in the data transfer system 100 shown in FIG. 1, and illustrates the way in which the monitor unit 108 functions.

In a first method step 201, the monitor unit 108 checks whether a message has been sent from the master unit 102. If this is the case, the message is stored temporarily by the monitor unit 108 and the method continues in a second method step 202. Otherwise, the first method step 201 is repeated.

In the second method step 202 the monitor unit 108 checks whether the message sent from the master unit 102 is a polling message directed to one of the slave units 104 to 106. A polling message that is directed to one of the slave units 104 to 106, and the slave unit 104 to 106 to which the polling message is directed, is identified by the monitor unit 108 on the basis of the address to which the polling message is addressed.

If the message sent from the master unit 102 is not a polling message directed to one of the slave units 104 to 106, the method is continued after the second method step 202 in a third method step 203. Otherwise, the method is continued after the second method step 202 in a fourth method step 204.

In the third method step 203, the message that was sent from the master unit 102 is forwarded from the monitor unit 108 to the bus system 101 without change. After the third method step 203, the first method step 201 is executed again.

In the fourth method step 204, the master unit 102 is instructed by the monitor unit 108 to interrupt all programs it is executing, to which end e.g. a ready-signal transferred via the signal line 112 is set to zero by the monitor unit 108. The value zero of the ready-signal is a deactivation signal which instructs the master unit 102 to interrupt all programs it is executing. After the fourth method step 204, the method is continued in a fifth method step 205.

In the fifth method step 205, the monitor unit 108 checks whether that slave unit 104 to 106 to which the polling message was directed has sent an interrupt request via its interrupt request line 109 to 111. If this is the case, the method is continued in the sixth method step 206. Otherwise, the fifth method step 205 is repeated.

In the sixth method step 206, the monitor unit 108 forwards the polling message that was temporarily stored in the first method step 201 to the bus system 101, and the monitor unit 108 switches into a transparent mode. The ready-signal for the master unit 102 is now triggered by the bus system 101. After the sixth method step 206, the method is continued in the first method step 201.

In addition, the monitor unit 108 forwards to the master unit 102 every message that is sent to the master unit 102 via the bus system 101.

The data transfer system 100 shown in FIG. 1 differs from a corresponding conventional data transfer system by virtue of the monitor unit 108. In a corresponding conventional data transfer system, the master unit 102 is connected directly to the bus system 101 and the interrupt request lines 109 to 111 are connected to the master unit 102. In the conventional data transfer system, polling messages directed from the master unit 102 to one of the slave units 104 to 106 are therefore periodically routed to the respective slave unit 104 to 106 via the bus system 101, and consequently block the access for the other master unit 103 to one of the slave units 104 to 106 via the bus system 101.

By virtue of the monitor unit 108, provision is therefore made for the bus system 101 to be unencumbered by periodic polling messages directed to a slave unit 104 to 106 from the master unit 102. When this slave unit 104 to 106 then sends an interrupt request, this interrupt request is not sent from the monitor unit 108 to the master unit 102, but is instead used as a trigger to forward the temporarily stored polling message to the bus system 101. The polling message is answered positively by the slave unit 104 to 106, since it now has the data available for the master unit 102. With the delivery of this data to the master unit 102, the ready-signal for the master unit 102 is also reset to one by the bus system 101, whereupon the master unit 102 continues its interrupted work.

In all, only one polling message is therefore sent via the bus system 101 and no interrupt routine is executed by the master unit 102 in response to an interrupt request. In particular, it is not necessary to implement an interrupt routine in the master unit 102. Furthermore, the use of the monitor unit 108 does not require any adaptation of the software executed by the master unit 102 and the slave units 104 to 106, since the polling from the master unit 102 and the sending of interrupt requests from the slave units 104 to 106 continues unchanged. In other words, the monitor unit 108 is transparent for this software, and can therefore be integrated easily and advantageously into a conventional data transfer system in order to convert it into a data transfer system 100 according to the invention.

In other exemplary embodiments of a data transfer system 100 according to the invention, a monitor unit 108 can be provided for each of a plurality of master units 102, 103, said monitor unit 108 being designed in a similar manner to the exemplary embodiment described with reference to FIG. 1 and FIG. 2 and being connected to slave units 104 to 107 via respective interrupt request lines 109 to 111.

Furthermore, in alternative exemplary embodiments of a data transfer system 100 according to the invention and the method according to the invention, provision can be made for transferring a valid-signal which can assume the values zero and one via the signal line 112, instead of a ready-signal. The value zero of the valid-signal indicates to the master unit 102 that the data it requested by means of a polling message is not available from a slave unit 104 to 106. According to the inventive method, the master unit 102 in this case is not blocked by a ready-signal after sending a polling message directed to a slave unit 104 to 106, and instead the polling messages sent from the master unit 102 are negatively answered by the monitor unit 108 using the value zero of the valid-signal until the slave unit 104 to 106 sends an interrupt request via its interrupt request line 109 to 111.

Although the invention is illustrated and described in detail above with reference to preferred exemplary embodiments, the invention is not restricted to the examples disclosed herein, and other variations may be derived therefrom by a person skilled in the art without thereby departing from the scope of the invention.

The invention claimed is:

1. A data transfer system, comprising:
 a bus system;
 a master unit configured to send messages;
 at least one slave unit allocated to the master unit and connected to the bus system, and configured to send interrupt requests directed to the master unit via an interrupt request line;
 a monitor unit designed as a hardware component and connected between the master unit and the bus system and connected to the interrupt request line of each slave unit allocated to the master unit, and configured:
  to receive the messages sent from the master unit and the interrupt requests sent via the interrupt request line from each slave unit allocated to the master unit, and
  to not forward to the bus system polling messages directed from the master unit to an allocated slave unit, and to prevent the polling messages from being periodically sent from the master unit via the bus system to the at least one allocated slave unit, until the at least one slave unit sends an interrupt request via the interrupt request line.

2. The data transfer system of claim 1, wherein an address range allocated to a slave unit is stored in the monitor unit for each slave unit allocated to the master unit.

3. The data transfer system of claim 2, wherein the monitor unit is configured to identify, on the basis of an address contained in a polling message, whether the polling message is directed to a slave unit that is allocated to the master unit.

4. The data transfer system of claim 1, wherein the monitor unit is configured, following receipt of a polling message directed from the master unit to an allocated slave unit, to instruct the master unit to interrupt all programs executed by the master unit and thereafter, following receipt of an interrupt request from the allocated slave unit, to forward the polling message to the bus system.

5. The data transfer system of claim 4, wherein the monitor unit is configured to instruct the master unit by way of a deactivation signal to interrupt all programs the master unit is executing.

6. The data transfer system of claim 5, wherein the monitor unit is configured, following the receipt of the interrupt request from the slave unit, to instruct the master unit by way of an activation signal to continue the interrupted programs.

7. The data transfer system of claim 1, wherein the monitor unit is configured to negatively answer polling messages which are directed from the master unit to an allocated slave unit, until the allocated slave unit sends an interrupt request via the interrupt request line.

8. The data transfer system of claim 1, wherein the monitor unit is configured to forward to the bus system every message from the master unit that is not a polling message directed to an allocated slave unit.

9. The data transfer system of claim 1, wherein the monitor unit is configured to forward to the master unit every message that is sent via the bus system to the master unit.

10. A method for transferring data in a data transfer system comprising a bus system, a master unit and at least one slave unit allocated to the master unit and connected to the bus system, and a monitor unit connected between the master unit and the bus system, the method comprising:
 with the monitor unit
  receiving messages sent from the master unit and interrupt requests sent via an interrupt request line from every slave unit allocated to the master unit, and
  not forwarding to the bus system polling messages directed from the master unit to an allocated slave unit, and preventing the polling messages from being periodically sent from the master unit via the bus system to the at least one allocated slave unit, until the at least one slave unit sends an interrupt request via the interrupt request line.

11. The method of claim 10, further comprising analyzing with the monitor unit an address contained in a polling message to identify whether the polling message is directed to an allocated slave unit.

12. The method of claim 10, further comprising:
 following receipt by the monitor unit of a polling message directed from the master unit to an allocated slave unit, prompting the monitor unit to instruct the master unit to interrupt all programs executing in the master unit, and
 following receipt of an interrupt request from the slave unit, prompting the monitor unit to forward the polling message to the bus system.

13. The method of claim 10, further comprising prompting the monitor unit to answer polling messages directed from the master unit to an allocated slave unit negatively until the allocated slave unit sends an interrupt request via the interrupt request line.

14. The method of claim 10, further comprising prompting the monitor unit to forward to the bus system every message from the master unit that is not a polling message directed to an allocated slave unit.

15. The method of claim 10, wherein the monitor unit forwards to the master unit every message that is sent via the bus system to the master unit.

\* \* \* \* \*